(No Model.)
L. WULFF.
CRYSTALLIZATION OF SACCHARINE OR OTHER SOLUTIONS.
No. 528,497. Patented Oct. 30, 1894.
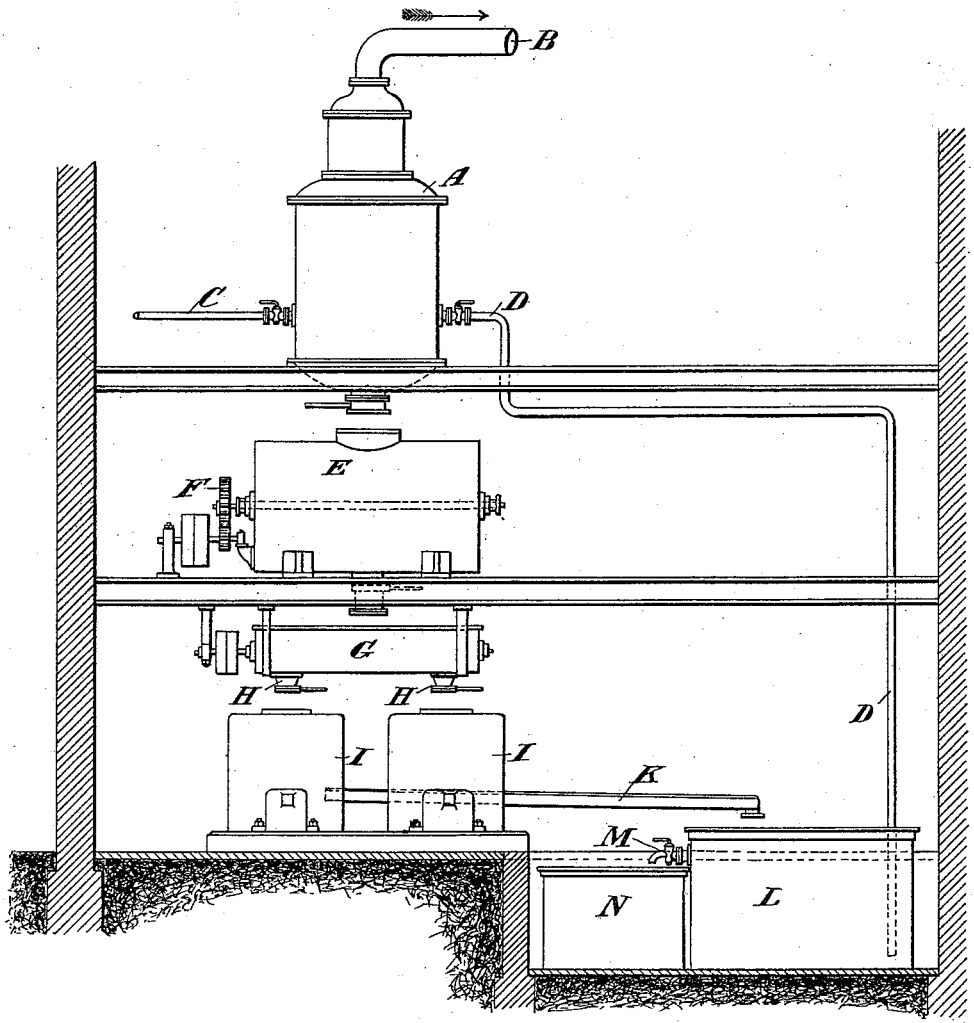
Witnesses:
George Barry.
C. Sundgren.
Inventor:
Ludwig Wulff
by attorneys
Brown & Seward

UNITED STATES PATENT OFFICE.

LUDWIG WULFF, OF SCHWERIN, ASSIGNOR, BY MESNE ASSIGNMENTS, TO JOHANNES BOCK, OF BRESLAU, GERMANY.

CRYSTALLIZATION OF SACCHARINE OR OTHER SOLUTIONS.

SPECIFICATION forming part of Letters Patent No. 528,497, dated October 30, 1894.

Application filed June 17, 1891. Serial No. 396,615. (No specimens.) Patented in Germany November 6, 1884, No. 33,190, and May 16, 1885, No. 39,957; in Austria-Hungary December 14, 1886, No. 49,033 and No. 13,485; in Belgium August 14, 1888, No. 82,900, and in France September 25, 1890, No. 208,458.

*To all whom it may concern:*

Be it known that I, LUDWIG WULFF, of Schwerin, in the Grand Duchy of Mecklenburg-Schwerin, German Empire, have invented a new and useful Improvement in the Crystallization of Saccharine and other Solutions, (which has been patented in Germany November 6, 1884, No. 33,190, and May 16, 1885, No. 39,957; in Austria-Hungary December 14, 1886, No. 49,033 and No. 13,485; in Belgium August 14, 1888, No. 82,900, and in France September 25, 1890, No. 208,458,) of which the following is a specification, reference being had to the accompanying drawing.

It has hitherto been the custom to effect the crystallization of solutions which have been evaporated by heat to a sirupy consistency by allowing such concentrated solutions to cool while at rest and protected from disturbance. I have however found that it is far more advantageous to subject such solutions to a slow and regular motion for obtaining good crystallization. By this means the solutions are caused to crystallize, and as crystallization proceeds every particle of the solution remaining uncrystallized is brought while cooling into contact with crystals which may either have been thrown into it or have been already formed within it and those constituents of the solution which are separable by cooling are deposited on those crystals. By this method I prevent the formation of too many new and small grains of crystal and I cause the crystals already present to grow or increase in size and I render the subsequent separation of the newly crystallized product more easily separable from the mother liquor. By this mode of operation even very weak solutions can be made to deposit crystallizing substance on the crystals present.

In order to effect the crystallization while the solution is kept in motion and to avoid the formation of small crystals it is essential that the solution should have been previously brought to a temperature at which in the beginning of the operation there will neither be any formation of crystals nor any dissolution of any substance in the solution. When the solution has been so prepared, single crystals or a mass of crystals previously obtained are added, and the whole is allowed to cool, keeping the solution in constant motion. The temperature of the solution in cooling down should be so regulated that it is constantly below the point of dissolution corresponding to the decrease of crystallizable substance in the liquor. In order to avoid the formation of fine grains, the crystals introduced should previously be heated to the temperature of the saturated solution. For the purpose of cooling the mixture thus obtained it is best to use cylindrical tanks provided with stirrers and false bottoms. Cooling may be effected by means of a jacket through which cold air or cold water is caused to circulate, most careful regulation of temperature of the solution being necessary.

Instead of a crystallizer with stirring apparatus a series of tanks may be connected together arranged either side by side or one above another or step-wise in such a way that the solution from one tank passes over to another and thus causes a flowing movement of the solution instead of agitating it by a stirrer. In using one tank the stirring apparatus may be replaced by a pump which draws off the solution from one part of the tank and discharges it again into another part so that suitable circulation or motion of the solution is kept up.

I sometimes proceed for the crystallization of solutions in motion in such a way that well developed crystals are produced in rich solutions and then gradually poorer solutions are introduced for the purpose of yielding their crystallizable substances to the crystals or grain already present.

Instead of the slow cooling by air or water I may avail myself of the action of a vacuum for the purpose of crystallization of solution. This will accelerate the process and will increase the movement of the masses of crystals.

The annexed drawing represents in elevation a system of apparatus for carrying out my process for producing well developed crystals from saturated or non-saturated solutions without the formation of fine grain or inferior crystals or crystal meal.

A is a vacuum pan such as is generally used for boiling solutions such as saccharine solutions.

B is the pipe leading to the vacuum pump.

C is the pipe for admitting the solution to be boiled under vacuum and D is a pipe for drawing in sirups or the like.

Below the vacuum pan A a vessel E is arranged provided with a stirrer F rotated by proper gearing.

This vessel which is surrounded by a jacket for the circulation of cooling air or water is the one for carrying into effect my crystallization process. It may be filled from the vacuum pan by means of a valve arranged at the bottom of said pan. Into this vessel I add, if it is entirely or partly filled with the solution, the well developed crystals.

The inner wall of the vessel F may be provided with a projection to co-operate in conjunction with the stirrer for the constant and continuous contact of the parts of the solutions with the introduced crystals.

G is a gutter below the crystallizing vessel F into which gutter the contents of F after the completion of the crystallizing process may be emptied to flow off through the valves or slides H H into the separators or centrifugal machines I I from which the liquor will run off by the gutter into the receiving tank.

What I claim as my invention is—

The process herein described of obtaining large single crystals from a saccharine or other solution consisting in first bringing said solution to a temperature at which there will neither be any formation of crystals nor any dissolution of added crystals, next adding to the said solution separately obtained crystals which have been previously heated to about the temperature of the said solution and then keeping the whole in motion while its temperature is gradually reduced, substantially as herein set forth.

In testimony that I claim the foregoing as my invention I have signed my name in presence of two subscribing witnesses.

LUDWIG WULFF.

Witnesses:
GEORG RICHTER,
MARTIN KÖRNER.